United States Patent
Sundaresan

(10) Patent No.: US 6,336,214 B1
(45) Date of Patent: Jan. 1, 2002

(54) SYSTEM AND METHOD FOR AUTOMATICALLY GENERATING BROWSABLE LANGUAGE GRAMMARS

(75) Inventor: Neelakantan Sundaresan, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/189,245

(22) Filed: Nov. 10, 1998

(51) Int. Cl.[7] ........................................ G06F 9/45
(52) U.S. Cl. ........................... 717/8; 717/5; 707/513
(58) Field of Search ................... 717/8, 4, 5, 9; 704/4, 5, 9, 8; 364/419.02; 370/84, 358; 707/513

(56) References Cited

U.S. PATENT DOCUMENTS

| | | | |
|---|---|---|---|
| 5,276,679 A | * 1/1994 | McKay et al. | 370/358 |
| 5,526,522 A | 6/1996 | Takeuchi | 717/2 |
| 5,677,835 A | * 10/1997 | Carbonell et al. | 704/8 |
| 5,678,052 A | * 10/1997 | Brisson | 704/4 |
| 5,848,386 A | * 12/1998 | Motoyama | 704/5 |
| 5,995,920 A | * 11/1999 | Carbonell et al. | 704/9 |
| 6,243,862 B1 | * 6/2001 | Lebow | 717/4 |

OTHER PUBLICATIONS

Tayeb–Bey, S. et al., Analysis and Conversion of Documents, Proceedings of the Fourteenth International Conference on Pattern Recognition, IEEE, Aug. 1998.*

Tayeb–Bey, S. et al., "Analysis and Conversion of Documents," Proceedings of the Fourteenth International Conference on Pattern Recognition, IEEE, Aug. 16–20, 1998, ISBN 0–8186–8512–3, Editors A.K. Jain et al., vol. 2, pp. 1089–1091.

* cited by examiner

*Primary Examiner*—Mark R. Powell
*Assistant Examiner*—Hoang-Vu Antony Nguyen-Ba
(74) *Attorney, Agent, or Firm*—Gates & Cooper LLP

(57) ABSTRACT

A technique for automatically generating browsable language grammars. A grammar specification is used to identify the structure of an input grammar, so that a specification pre-processor, grammar parser and grammar generator can work together to generate a marked up grammar that is a browsable representation of the input grammar. The specification defines how a terminal is represented, how a non-terminal is represented, how production rules are represented, etc. Using the specification, the specification pre-processor generates the grammar parser for subsequent use with production rules found in the input grammar. When an actual set of production rules in the input grammar are provided to the grammar parser, it generates an intermediate form of the grammar that is then used by the grammar generator to generate the browsable, marked up version of the production rules.

24 Claims, 5 Drawing Sheets

| | 108 |
|---|---|
| Nonterminals: [A-Z]a-zA-Z]* | /* an upper case letter followed by by zero or more of lowercase or uppercase letters*/ |
| Terminals: "[A-za-z]+" | /* one or more of letters within quotes*/ |
| ProductionOperator:=> | /*an equal-to sign followed by a greater-than sign*/ |
| Comments{[~]*} | /* a string of characters within braces*/ |
| RHSSeparator : \| | /* Operator for separating different right-hand-sides of the productions with the same left-hand-side*/ |
| NullRHS:e | /* how is an empty production rules is specified*/ |

FIG. 2A

```
{Top level production rules}

Statement => IfThenStatement
            | IfThenElseStatement
            | WhileStatement
            | AssignmentStatement {Statements}

IfThenStatement      => "if" "("Expression")" Statement
IfThenElseStatement  => "if" "("Expression")" Statment "else" Statement
WhileStatement       => "while" "("Expression")" Statement
AssignmentStatement  => "VARIABLE" "=" Expression {Expressions}

Expression => Expression "+" Expression
            | Expression "-" Expression
            | Expression "*" Expression
            | Expression "/" Expression
            | "VARIABLE"
            | "LITERAL"
```

FIG. 2B

```html
<table cellpadding="5" border="1" bgcolor="#f5dcb3" width="100%">
    <tr align="left">
        <td><strong>Top level productions</strong></td>
    </tr>
    <tr>
        <td>
            <table bgcolor="#f5dcb3: border="0">
                <tr valign="top">
                    <td align="right">
                        <a name="Statement"></a>
                        [1]<!--production number-->
                    </td>
                    <td align="right">
                        <font>
                            <code>
                                Statement
                            </code>
                        </font>
                    </td>
                    <td align="center">
                        <font>
                            <code>
                                =>
                            </code>
                        </font>
                    </td>
                    <td align="left">
                        <font>
                            <code>
                                <a href = "#IfThenStatement">
                                    IfThenStatement
                                </a>

<a href = "#IfThenElseStatement">
                                    IfThenElseStatement
                                |</a>

<a href="WhileStatement">
                                    WhileStatement
                                |</a>

<a href="AssignStatement">
                                    AssignStatement
                                </a>
                            </code>
                        </font>
                    </td>
                </tr>
            </table>
        </td>
    </tr>
</able>
```

SYSTEM AND METHOD FOR AUTOMATICALLY GENERATING BROWSABLE LANGUAGE GRAMMARS

BACKGROUND OF THE INVENTION

1. Field of the Invention

This invention relates in general to language grammars, and in particular, to a system for automatically generating browsable language grammars.

2. Description of Related Art

The World Wide Web (WWW) of the Internet has become the primary medium for communication and collaboration. Internet browsers have become ubiquitous as viewers and editors for documents. As a result, methods used to share, read, and update documents have changed significantly.

For example, as new specifications for programming languages, script languages, meta-data, etc., are drafted, browsable versions of these specifications are usually published on the Internet. Such specifications usually are published in the form of a grammar having production rules.

For people reading these specifications using a browser, it is useful to mark up production rules within the grammars to make them more understandable. Some publishers hand-code the production rules to make them more browsable, while other publishers do not make the production rules browsable at all.

In one example, U.S. Pat. No. 5,678,052 describes a method and system for converting a text-based Backus-Naur Form (BNF) grammar into a compressed syntax diagram. In another example, U.S. Pat. No. 5,526,522 describes an automatic program generating system that performs recursive conversion of a program specification into a syntactic tree format.

However, there is still a need then for a mechanism that automatically marks up grammar production rules to enhance their readability and accessibility. There is also a need for such mechanisms that are implemented using standardized markup languages.

SUMMARY OF THE INVENTION

To overcome the limitations in the prior art described above, and to overcome other limitations that will become apparent upon reading and understanding the present specification, the present invention discloses a method, system and article of manufacture for automatically generating browsable language grammars. A grammar specification is used to identify the structure of an input grammar, so that a specification pre-processor, grammar parser and grammar generator can work together to generate a marked up grammar that is a browsable representation of the input grammar. The specification defines how a terminal is represented, how a non-terminal is represented, how production rules are represented, etc. Using the specification, the specification pre-processor generates the grammar parser for subsequent use with production rules found in the input grammar. When an actual set of production rules of an input grammar are provided to the grammar parser, it generates an intermediate form of the grammar that is then used by the grammar generator to generate the browsable, marked up version of the input grammar.

BRIEF DESCRIPTION OF THE DRAWINGS

Referring now to the drawings in which like reference numbers represent corresponding parts throughout:

FIGS. 2A, 2B, and 2C are block diagrams that illustrate an exemplary grammar specification, input grammar, and marked up grammar, respectively, according to the preferred embodiment of the present invention.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural and functional changes may be made without departing from the scope of the present invention.

OVERVIEW

The preferred embodiment of the present invention describes a technique for automatically marking up grammar production rules in a manner that enhances their readability and accessibility. A meta-language specification specifies the production rules of a grammar. For example, the specification defines how a terminal is represented (within quotes, etc.), how a non-terminal is represented (as names with their first letter capitalized, etc.), how productions are represented (what is the arrow "→" character for a productions, etc.). Using the specification, the system generates a parser for production rules found in an input grammar. When an actual set of production rules of an input grammar are provided to this parser, it generates an intermediate form of the input grammar that is then used by a grammar generator to generate a browsable, marked up version of the production rules.

HARDWARE ENVIRONMENT

Figure 1:
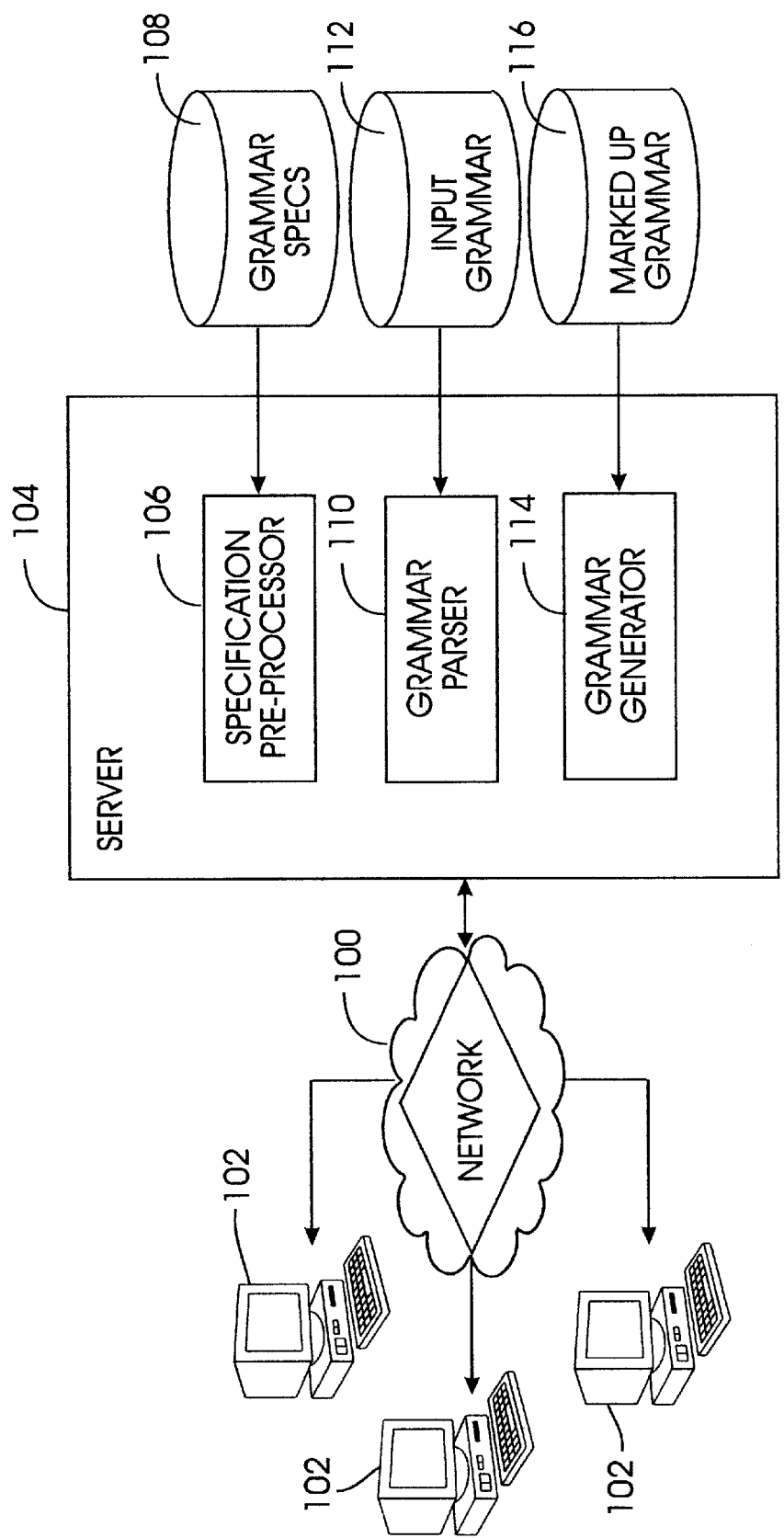
FIG. 1 is a block diagram that illustrates an exemplary client-server hardware environment of the preferred embodiment of the present invention.

FIG. 1 schematically illustrates an exemplary hardware environment that could be used in the preferred embodiment of the present invention, and more particularly, illustrates a typical distributed computer system using the Internet 100 to connect client systems 102 to server systems 104. A typical combination of resources may include clients 102 that are personal computers or workstations, and servers 104 that are personal computers, workstations, minicomputers, or mainframes. These systems are coupled to one another over a network 100, which may include other networks such as LANs, WANs, SNA networks, as well as the Internet.

However, those skilled in the art will recognize that the exemplary environment and components illustrated in FIG. 1 are not intended to limit the present invention. Indeed, those skilled in the art will recognize that other alternative hardware environments may be used without departing from the scope of the present invention.

The preferred embodiment of the present invention is comprised of a number of different components executed by the server computer 104. A specification pre-processor 106 accepts a grammar specification 108, recognizes elements within the specification 108 for the grammar language, processes each of these elements, and generates the instructions for a grammar parser 110 accordingly. The grammar parser 110 accepts an input grammar 112, recognizes elements within the input grammar 112, and transforms the input grammar 112 into an intermediate form recognizable by a grammar generator 114. The grammar generator 114 translates or converts the intermediate form of the input grammar 114 to generate a browsable, marked up grammar 116.

In general, the specification pre-processor 106, grammar specification 108, grammar parser 110, input grammar 112, grammar generator 114, and browsable, marked up grammar 116 each are comprised of data and/or instructions which, when read, interpreted, and/or executed by the server computer 104, causes the computer 104 to perform the steps for performing and/or using the present invention. Generally, the data and/or instructions are embodied in and/or readable from a device, carrier or media, such as memory, data storage devices, and/or remote devices coupled to the computer 104 via data communications devices.

Thus, the present invention may be implemented as a method, apparatus, or article of manufacture using standard programming and/or engineering techniques to produce software, hardware, firmware, or any combination thereof. In addition, the term "article of manufacture" as used herein is intended to encompass logic and/or data embodied in or accessible from any device, carrier, or media.

OPERATION OF THE INVENTION

The syntax for a programming language is often represented in terms of a grammar having one or more production rules. Such grammars have terminals and non-terminals, wherein terminals are tokens or strings of the programming language and non-terminals are variables that can recursively expand to a sequence of terminals and non-terminals. Production rules for the grammar are typically expressed in BNF (Backus-Naur Form) or EBNF (extended BNF).

To generate a browsable, marked up grammar 116 in the preferred embodiment of the present invention, the following steps are performed:

1. A grammar specification 108 for the syntax of the grammar is provided to the specification pre-processor 106. An exemplary grammar specification 108 is illustrated in FIG. 2A. This specification 108 identifies the format of terminals, non-terminals, production operators, comments, right-hand-side separators for production rules, and empty production rules. Note that the specification 108 provided herein is fairly simple, but more complex specifications 108 could be used as well.

2. The specification pre-processor 106 uses this grammar specification 108 to generate and configure the grammar parser 110, which in turn can process any input grammar 112 written using this syntax or convention. Note that the programming of such grammar parsers 110 are well known in the art, and thus is not described further herein.

3. Once the grammar parser 110 is built, any set of production rules of an input grammar 112 written in this syntax can be processed by the parser 110. An exemplary input grammar 112 is illustrated in FIG. 2B. In this example, non-terminals are represented by names with the first letter in upper case, terminals are described as quoted strings, the arrows in the productions are represented as "→" (an equals sign followed by a greater-than sign), alternative right-hand-sides for the same left-hand-side are represented using "|" (vertical bars), empty productions are represented by putting an "e" on the right-hand-side, and comments are enclosed in "{ . . . }" (braces).

4. The grammar parser 110 is a front-end to the grammar generator 114, and generates an intermediate or common form of the input grammar 112 (such as a representation of BNF or EBNF) for use by the grammar generator 114. The grammar generator 114 parses any production rules from the intermediate form and generates a marked up grammar 116 as its output, wherein the marked up grammar 116 embodies the production rules of the input grammar 112 in a form suitable for browsing. An exemplary fragment of a marked up grammar 116 (comprising only the production rules labeled as "Top level production rules" in FIG. 2B) is illustrated in FIG. 2C.

The following semantics for marking up the production rules in the marked up grammar 116 are desirable although not required:

1. A non-terminal on the left-hand-side of a production rule points to its occurrence on the right-hand-side of a production rule.

2. A non-terminal on the right side of a production rule points to its next and/or previous occurrence in the same or another production rule.

3. There is a mechanism for traversing from the right-hand-side occurrence of a production rule to its left-hand-side occurrence.

4. There is a facility for traversing from the right-hand side occurrence of a non-terminal to a particular (e.g., first) occurrence of the non-terminal on the left-hand side of a production.

5. There is a facility for navigating over all the production rules in which a particular non-terminal occurs on the left-hand side.

6. There is a facility for navigating over all the production rules.

7. There is a mechanism for viewing all the non-terminal occurrences in the production rules from a non-terminal.

8. There is a mechanism for optionally viewing semantic comments associated with production rules.

In the example of FIG. 2C, the marked up grammar 116 is in HyperText Markup Language (HTML) format for browsing purposes. The HTML comprises a table with some specific background colors, fonts, etc. in the HTML of FIG. 2C, there are four alternative right-hand-sides (IfThenStatement, IfThenElseStatement, WhileStatement, AssignStatement). All of these are generated as hyperlinks (HREFs) pointing to the actual occurrence of these in a production rule on the left-hand-side.

For example, the occurrence of "IfThenStatement" on the right-hand-side points to "#IfThenStatement", which refers to an HTML table that corresponds to the "IfThenStatement" non-terminal. Similarly, the HTML for "Top level production" described above is labeled "Statement" (because Statement is the left-hand-side non-terminal) through the "name" attribute of the <a> tag. Another production can refer to this using "#Statement".

The marked up grammar 116 is in an HTML format in the preferred embodiment because HTML is the moss widely used browser language on the Internet. However, HTML only implements a single directional link and does not include multidimensional links.

The present invention overcomes this problem by associating pop-up menus with an item in order to provide the semantics described above for marking up the production rules. For example, a marked up non-terminal on the right-hand-side of a production rule will have a pop-up menu with the following 5 menu items:

i. Go to its production rule.

ii. Go to its previous right-hand-side occurrence.

iii. Go to its next right-hand-side occurrence.

v. Show any comments associated with the item.

Moreover, those skilled in the art will recognize that the translation of the input grammar 114 to a marked up grammar 116 in an HTML format can achieve any number of different visual and navigational effects.

Although the grammar generator 116 in the preferred embodiment translates the production rules of the input grammar 112 into an HTML format, an alternative embodiment may generate the marked up grammar 116 in an eXtensible Markup Language (XML) format or the fan Cat of another mark up language. If the marked up grammar 116 is generated in an XML format, more powerful XML-style links (multi-dimensional links, semantic links, etc.) may be used for a better browsing experience.

For example, an Xlink extended link group can be formed corresponding to each non-terminal in the input grammar 112. The extended link, unlike a simple HTML link, can connect multiple resources (with possible one local resource).

For example, an Xlink extended link group can he generated for non-terminals as follows:

```
</nt-group-1 xml:link="extended" inline="false">
    <locator href="#Statement.occ1" role="left-hand-side"/>
    <locator href="#Statement.occ2" role="right-hand-side"/>
    <locator href="#Statement.occ3" role="right-hand-side"/>
</nt-group>
```

In the above example, three occurrences of the non-terminal "Statement" are listed, one of them being its left-hand-side occurrence, and the others being its right-hand-side occurrences (this is indicated using the "role" attribute). Thus, using extended links, the left-hand-side occurrence of a non-terminal can be linked to each of its right-hand-side occurrences, which can be used in a visual display system to traverse over the occurrence of the same non-terminal across productions.

There are other attributes to the Xlink element like "show" (which describes a policy of how the link should be displayed when the resource is traversed), and "actuate" (which describes a policy for when to traverse a link). These attributes could be used in conjunction with the other Xlink attribute to generate different traversal behaviors.

In yet another embodiment, the marked up grammar 116 may be generated in an XML format, and converted again to an HTML/Dynamic HTML (HTML+scripts) format using a style-sheet specification language such as XSL.

Another advantage to generating the marked up grammar 116 in an XML format is that it is more general than HTML, and can be used for purposes other than just browsing. For example, XML provides a facility where tag names can be specified as belonging to different name spaces. The idea behind providing such a facility is that different processors can act on different parts of the same XML document by processing only those tags in the name space that they understand and ignoring other name spaces.

Thus, the grammar specification 108, input grammar 112, and browsable, marked up grammar 116 could each have their own name spaces within one or more XML documents. Further, the specification pre-processor 106, grammar parser 110, and grammar generator 114, and browsable, marked up grammar 116 could each operate only on their respective associated name space(s) of an XML document.

LOGIC OF THE INVENTION

Figure 3:
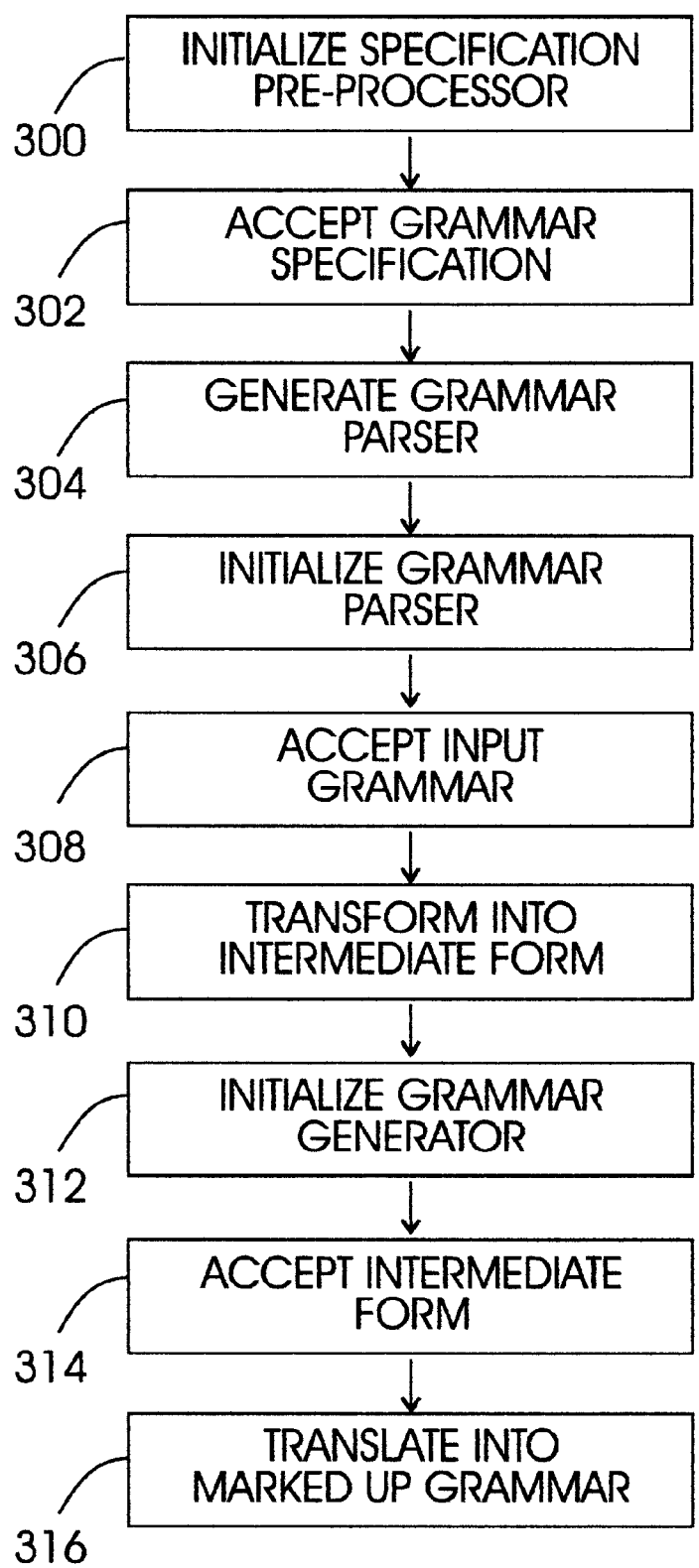
FIG. 3 is a flowchart that illustrates the logic performed by the preferred embodiment of the present invention.

FIG. 3 is a flowchart that illustrates the steps performed by the preferred embodiment of the present invention.

Block 300 represents the grammar parser 110 initializing.

Block 302 represents the specification pre-processor 106 accepting the grammar specification 108.

Block 304 represents the specification pre-processor 106 generating the instructions for a grammar parser 110 from the grammar specification 108.

Block 306 represents the grammar parser 110 initializing.

Block 308 represents the grammar parser 110 accepting the input grammar 112.

Block 310 represents the grammar parser 110 transforming the input grammar 112 into an intermediate form recognizable by a grammar generator 114.

Block 312 represents the grammar generator 114 initializing.

Block 314 represents the grammar generator 114 accepting the intermediate form from the grammar parser 110.

Block 300 represents the grammar generator 114 translating or converting the intermediate form of the input grammar 114 and generating the browsable, marked up grammar 116 accordingly.

CONCLUSION

This concludes the description of the preferred embodiment of the invention. The following describes some alternative embodiments for accomplishing the present invention. For example, any type of computer, such as a mainframe, minicomputer, or personal computer, could be used to implement the present invention. In addition, the computer may or may not be part of a network. Further, the present invention is not limited to specific formats recited herein for the grammar specifications, input grammars, or marked up grammars. For example, the marked up grammars could be generated in any number of different formats other than HTML or XML.

In summary, the present invention discloses a method, system, and article of manufacture for automatically generating browsable language grammars. A grammar specification is used to identify the structure of an input grammar, so that a specification pre-processor, grammar parser and grammar generator can work together to generate a marked up grammar that is a browsable representation of the input grammar. The specification defines how a terminal is represented, how a non-terminal is represented, how production rules are represented, etc. Using the specification, the specification pre-processor generates the grammar parser for subsequent use with production rules found in the input grammar. When an actual set of production rules of an input grammar are provided to the grammar parser, it generates an intermediate form of the grammar that is then used by the grammar generator to generate the browsable, marked up version of the production rules.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for automatically generating a browsable language grammar, comprising:

(a) processing a grammar specification in a specification pre-processor to generate a grammar parser for subsequent use with production rules of an input grammar, wherein the grammar specification comprises a specified format of the input grammar;

(b) parsing one or more of the production rules of the input grammar in the grammar parser to generate an intermediate form of a grammar; and (c) generating a marked up grammar in a grammar generator from the intermediate form of the grammar.

2. The method of claim 1 above, wherein the specified format is comprised of one or more elements selected from a group identifying how a terminal is represented, how a non-terminal is represented, how a production rule operator is represented, how a comment is represented, how a right-hand-side separator for production rules is represented, and how an empty production rule is represented.

3. The method of claim 1 above, wherein the input grammar is comprised of one or more elements selected from a group comprising a terminal, non-terminal, production rule, and comment.

4. The method of claim 1 above, wherein the marked up grammar is comprised of one or more elements selected from a group comprising a terminal, non-terminal, production rule, and comment.

5. The method of claim 1 above, wherein the marked up grammar is in HyperText Markup Language (HTML) format.

6. The method of claim 1 above, wherein the marked up grammar is in eXtensible Markup Language (XML) format.

7. The method of claim 1 above, wherein the marked up grammar includes one or more items selected from a group comprising:

a non-terminal on a left-hand-side of a production rule pointing to its occurrence on a right-hand-side of a production rule;

a non-terminal on a right side of a production rule pointing to its next and/or previous occurrence in a same or another production rule;

a method for traversing from a right-hand-side occurrence of a production rule to its left-hand-side occurrence;

a method for traversing from a right-hand side occurrence of a non-terminal to a particular occurrence of a non-terminal on a left-hand side of a production;

a method for navigating over all production rules in which a particular non-terminal occurs on a left-hand side;

a method for navigating over all production rules;

a method for viewing all non-terminal occurrences in the set of production rules from a non-terminal; and a method optionally viewing semantic comments associated with one or more of the production rules.

8. The method of claim 1 above, wherein one or more functions are associated with an item of the marked up grammar, and the functions are selected from a group comprising:

a function for displaying a production rule for an item in the marked up grammar;

a function for displaying a previous right-hand-side occurrence for an item in the marked up grammar;

a function for displaying a next right-hand-side occurrence for an item in the marked up grammar;

a function for displaying all occurrences of a non-terminal item in the marked up grammar; and a function for displaying comments associated with an item in the marked up grammar.

9. A system for automatically generating browsable language grammars, comprising:

(a) means for processing a grammar specification in a specification pre-processor to generate a grammar parser for subsequent use with production rules of an input grammar, wherein the grammar specification comprises a specified format of the input grammar;

(b) means for parsing one or more of the production rules of the input grammar in the grammar parser to generate an intermediate form of a grammar; and (c) means for generating a marked up grammar in a grammar generator from the intermediate form of the grammar.

10. The system of claim 9 above, wherein the specified format is comprised of one or more elements selected from a group identifying how a terminal is represented, how a non-terminal is represented, how a production rule operator is represented, how a comment is represented, how a tight-hand-side separator for production rules is represented, and how an empty production rule is represented.

11. The system of claim 9 above, wherein the input grammar is comprised of one or more elements selected from a group comprising a terminal, non-terminal, production rule, and comment.

12. The system of claim 9 above, wherein the marked up grammar is comprised of one or more elements selected from a group comprising a terminal, non-terminal, production rule, and comment.

13. The system of claim 9 above, wherein the marked up grammar is in HyperText Markup Language (HTML) format.

14. The system of claim 9 above, wherein the marked up grammar is in eXtensible Markup Language (XML) format.

15. The system of claim 9 above, wherein the marked up grammar includes one or more items selected from a group comprising:

a non-terminal on a left-hand-side of a production rule pointing to its occurrence on a right-hand-side of a production rule;

a non-terminal on a right side of a production rule pointing to its next and/or previous occurrence in a same or another production rule;

a method for traversing from a right-hand-side occurrence of a production rule to its left-hand-side occurrence;

a method for traversing from a right-hand side occurrence of a non-terminal to a particular occurrence of a non-terminal on a left-hand side of a production;

a method for navigating over all production rules in which a particular non-terminal occurs on a left-hand side;

a method for navigating over all production rules;

a method for viewing all non-terminal occurrences in the set of production rules from a non-terminal; and a method optionally viewing semantic comments associated with one or more of the production rules.

16. The system of claim 9 above, wherein one or more functions are associated with an item of the marked up grammar, and the functions are selected from a group comprising:

a function for displaying a production rule for an item in the marked up grammar;

a function for displaying a previous right-hand-side occurrence for an item in the marked up grammar;

a function for displaying a next right-hand-side occurrence for an item in the marked up grammar;

a function for displaying all occurrences of a non-terminal item in the marked up grammar; and a function for displaying comments associated with an item in the marked up grammar.

17. An article of manufacture embodying logic for performing a method for automatically generating browsable language grammars, comprising:

(a) processing a grammar specification in a specification pre-processor to generate a grammar parser for subsequent use with production rules of an input grammar, wherein the grammar specification comprises a specified format of the input grammar;

(b) parsing one or more of the production rules of the input grammar in the grammar parser to generate an intermediate form of a grammar; and (c) generating a marked up grammar in a grammar generator from the intermediate form of the grammar.

18. The article of manufacture of claim 17 above, wherein the specified format is comprised of one or more elements selected from a group identifying how a terminal is represented, how a non-terminal is represented, how a production rule operator is represented, how a comment is represented, how a right-hand-side separator for production rules is represented, and how an empty production rule is represented.

19. The article of manufacture of claim 17 above, wherein the input grammar is comprised of one or more elements selected from a group comprising a terminal, non-terminal, production rule, and comment.

20. The article of manufacture of claim 17 above, wherein the marked up grammar is comprised of one or more elements selected from a group comprising a terminal, non-terminal, production rule, and comment.

21. The article of manufacture of claim 17 above, wherein the marked up grammar is in HyperText Markup Language (HTML) format.

22. The article of manufacture of claim 17 above, wherein the marked up grammar is in eXtensible Markup Language (XML) format.

23. The article of manufacture of claim 17 above, wherein the marked up grammar includes one or more items selected from a group comprising:

a non-terminal on a left-hand-side of a production rule pointing to its occurrence on a right-hand-side of a production rule;

a non-terminal on a right side of a production rule pointing to its next and/or previous occurrence in a same or another production rule;

a method for traversing from a right-hand-side occurrence of a production rule to its left-hand-side occurrence;

a method for traversing from a right-hand side occurrence of a non-terminal to a particular occurrence of a non-terminal on a left-hand side of a production;

a method for navigating over all production rules in which a particular non-terminal occurs on a left-hand side;

a method for navigating over all production rules;

a method for viewing all non-terminal occurrences in the set of production rules from a non-terminal; and a method optionally viewing semantic comments associated with one or more of the production rules.

24. The article of manufacture of claim 17 above, wherein one or more functions are associated with an item of the marked up grammar, and the functions are selected from a group comprising:

a function for displaying a production rule for an item in the marked up grammar;

a function for displaying a previous right-hand-side occurrence for an item in the marked up grammar;

a function for displaying a next right-hand-side occurrence for an item in the marked up grammar;

a function for displaying all occurrences of a non-terminal item in the marked up grammar; and a function for displaying comments associated with an item in the marked up grammar.

* * * * *